Nov. 8, 1949   W. CASTEDELLO   2,487,308
BRAKE FOR CAMERA FOCUSING KNOBS
Filed Nov. 30, 1945

WILLIAM CASTEDELLO
INVENTOR

ATTORNEY

Patented Nov. 8, 1949

2,487,308

UNITED STATES PATENT OFFICE 2,487,308

BRAKE FOR CAMERA FOCUSING KNOBS

William Castedello, Stamford, Conn., assignor to The Kalart Company, Inc., Stamford, Conn.

Application November 30, 1945, Serial No. 631,993

4 Claims. (Cl. 95—46)

This invention relates to cameras having a casing, a camera bed and a lens support slidably mounted on the camera bed, and more particularly to improvements in the means for securing the lens support on the camera bed.

One object of the invention is to provide a novel and improved brake or locking device by which the lens support can be conveniently and automatically secured in any desired position on the camera bed.

Another object of the invention is the provision of a novel and improved brake permitting simultaneous operation with one hand of the adjusting means conventionally used for movement of the lens support and of the means for securing the lens support.

Another object of the invention is the provision of a novel brake which will automatically return into its position securing the lens support on the camera bed when released by the operator after the lens support has been placed in the desired position on the camera bed.

Another object of the invention is a novel brake which comprises comparatively few parts, is simple in design, can be conveniently and inexpensively manufactured, and is reliable in operation.

Other and further objects, features and advantages of the invention will appear hereinafter and in the appended claims forming part of the application.

According to a now preferred embodiment of the invention one of the focusing knobs conventionally used for operating the adjusting means for the lens support such as a pinion and a rack, is provided with a peripheral toothing which is normally engaged by a correspondingly toothed member, thereby securing the focusing knob and with it the lens support in a desired fixed position relative to the camera bed. There is further provided a release means by which the toothed member can be disengaged from the toothing when and while it is desired to adjust the lens support. This release means is so constructed and positioned that it can be operated while the focusing knob is revolved and with the same hand which is used for revolving the knob.

In the accompanying drawing a now preferred embodiment of the invention is shown by way of illustration and not by way of limitation.

Figure 1:
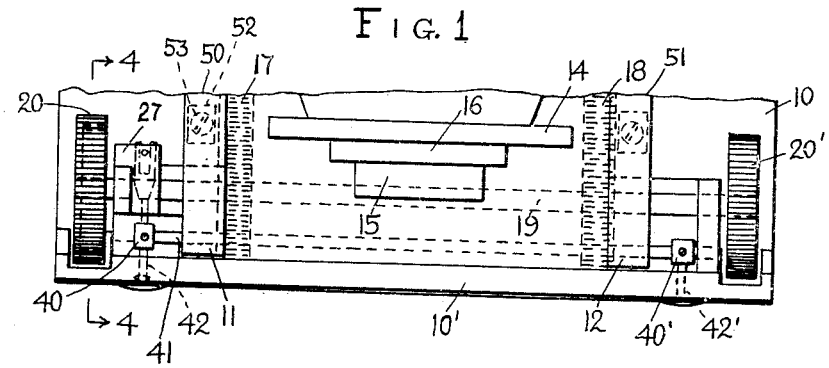
Fig. 1 is a fractional plan view of a conventional camera bed and a lens support in conjunction with a locking and braking means according to the invention.
Figure 2:
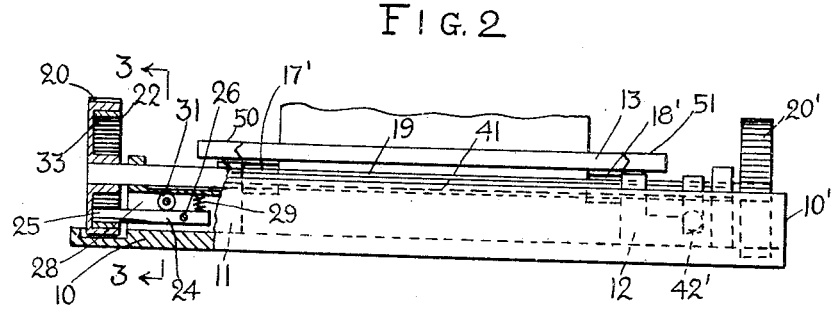
Fig. 2 is an elevational front view of Fig. 1, the locking and braking means according to the invention being shown partially in section.

Referring now to the figures in detail, Figs. 1 and 2 show fractional views of a conventional camera comprising a camera bed 10 hinged to the camera casing (not shown) and supporting two bearing blocks 11 and 12 fastened to camera bed 10 by screws 54. The camera bed also supports two tracks 50 and 51 fastened thereto by means of posts 52 and screws 53, for slidably guiding and supporting the lens support or carrier 13 on which a lens board 14 is mounted. Lens board 14 supports a lens 15 and a shutter 16, both being of conventional design. The lens support can be moved relatively to the camera bed by any suitable means. According to Figs. 1 and 2, racks 17 and 18 are provided at the lower side of lens support 13. These racks are engaged by pinions 17' and 18' mounted for rotation with a shaft 19 rotatably supported by bearing blocks 11 and 12. At both ends or only at one end of a shaft 19 knurled focusing knobs 20 and 20' are provided by means of which shaft 19 may be rotated, thereby moving the lens support and with it lens board 14 relative to the camera.

The arrangement as hereinbefore described is conventional and not part of the invention which will now be described in detail.

As it is well known in the art, means must be provided to secure or fix the lens support and with it the lens in any desired position relative to the camera bed. The position of the lens relative to the camera bed determines the distance between the lens and a plate or film placed in the camera and hence controls the focus of the lens. The lens support, therefore, must be held accurately in the selected position in order not to disturb the focusing of the lens. As previously explained, one of the main objects of the invention is the provision of a means permitting to secure and arrest automatically the lens support 13 in any desired position on camera bed 10.

In general, the brake or locking device according to the invention comprises an internal or external toothing or gearing provided at one of the focusing knobs and a stationary toothed member which is normally urged into engagement with the toothed portion of the focusing knob, thereby securing this knob in any desired angular position, and which can be released from engagement with the focusing knob when and while it is desired to rotate this knob for focusing of the lens.

More specifically, focusing knob 20 is cup-shaped and the internal peripheral wall of the focusing knob is provided with a comparatively fine toothing 22. This toothing may be cut either directly into the walls of the focusing knob, or, as shown in the drawings, a separate sleeve 23 having a toothing may be fitted in the focusing knob. However, it should be understood an external peripheral toothing can also be provided, for instance the knurling of the focusing knob may be used. Toothing 22 coacts with a lever 24 having a toothed portion 25 and being pivotally supported on a pivot 26. A spring 29 engaging at one end lever 24 and at the other end abutting against a wall of recess 28 urges lever 24 into a position in which the toothed portion 25 thereof is disengaged from toothing 22, thereby permitting rotation of focusing knob 20.

The position of lever 24 is further controlled by a member 30 which is slidably mounted in a boring in an extension of bearing block 11. Member 30 has a tapered portion 31 which extends into space 28 of bearing block 11 and is continued into a pin 32 slidably passed through an opening in bearing block 11 and projecting therefrom. At the opposite end of member 30, there is provided a recess 33 in which is inserted a spring 34 abutting at one end against the bottom of recess 33. The other end of spring 34 is fastened to a pin 35 secured to bearing block 11. As it will be apparent, spring 34 urges member 30 toward the left (in the view shown in Fig. 3). Longitudinal slots 36 and 36' in member 30 permit such axial movement of member 30 by the action of spring 34. Tapered portion 31 of member 30 is so shaped that in the aforementioned left hand position of sleeve 30 a wide section of the tapered portion abuts against lever 24, thereby forcing toothed portion 25 of this lever into engagement with the toothing 22 of the focusing knob thus securing focusing knob 20 in a definite angular position which in turn fixes the position of lens support 13. Since the focusing knob is secured in its position by the engagement of teeth, the angular position of the focusing knob is positively fixed. By providing fine teeth for the toothing 22 it is possible to secure the focusing knob accurately in any desired angular position.

For the purpose of releasing the focusing knob, dogs or pawls 40 and 40' are provided. These dogs are rigidly fastened to a shaft 41 rotatably supported on bearing blocks 11 and 12. Dog 40 is positioned opposite pin 32 of member 30, as can best be seen in Figs. 1 and 3. Dog 40 coacts with a push button 42 which is slidably inserted in a boring of an extension 10' of camera bed 10. The inner end of push button 42 rests against dog 40 while the head of the push button is located at the outside of part 10' of the camera bed. The length of the push button shaft is so selected that the push button head protrudes slightly from the camera bed when the component parts of the brake are in the position shown in Fig. 3, that is in the position in which toothed member 25 engages toothing 22. Push button 42 is held in its position within the camera bed by means of a cover 43 which may be part of the leather covering usually used to cover part of the camera casing. It is of course also possible to provide other means to secure the push button in its position.

The position of the push button 42 relative to the focusing knob 20 can best be seen in Fig. 1. As will be apparent from this figure, the push button is located in such position that an operator rotating focusing knob 20 can use the same hand to reach push button 42 without changing his grip.

A second push button 42' is provided opposite dog 40'. This second push button is located in the same position relative to focusing knob 20' as is push button 42. However, in certain cases it may be preferable to provide only one push button closely adjacent to focusing knob 20. In this case dog 40' and push button 42' may be omitted and shaft 41 may be shortened. On the other hand, it is also possible to provide a brake as has been described in conjunction with focusing knob 20 in focusing knob 20' also.

Figures 3, 4:
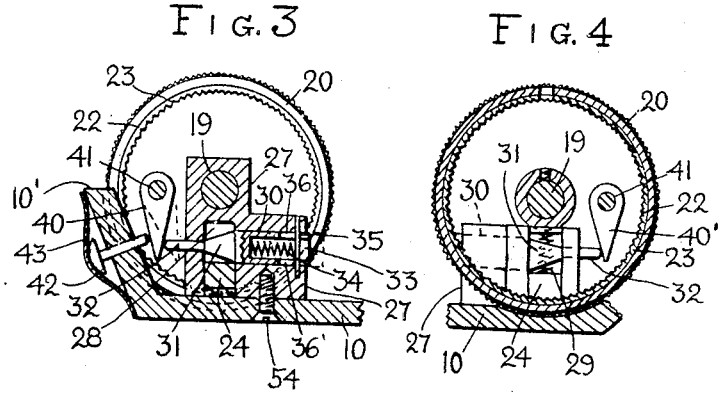
Fig. 3 is a sectional view along line 3—3 of Fig. 2 on an enlarged scale.
Fig. 4 is a sectional view along line 4—4 of Fig. 1 on an enlarged scale.

When it is desired to release the brake for rotation of the focusing knobs, the photographer simply depresses one of the push buttons. The depressed push button then will swing dogs 40 and 40' in a counterclockwise direction (as shown in Fig. 3). As a result, dog 40 will force member 30 toward the right (as shown in Fig. 3), thereby releasing lever 24 for action by spring 29 which will disengage toothed portion 25 of lever 24 from toothing 22. The focusing knobs can now be freely rotated until the depressed push button is released whereupon toothed portion 25 will automatically reengage toothing 22, thereby again securing the focusing knobs in definite angular positions.

While the invention has been described in detail with respect to a certain now preferred example and embodiment it will be understood by those skilled in the art after understanding the invention, various changes and modifications may be made without departing from the spirit and scope of the invention and it is intended therefore in the appended claims, to cover all such changes and modifications.

What is claimed as new and desired to be secured by Letters Patent is:

1. A brake and locking device for the lens support of a camera having a bed on which the lens support is movable and a drive means for the lens support operated by a focusing knob, said knob comprising a cup-shaped focusing member having an internal peripheral toothing, a support structure fastened to the camera bed, a first member pivotally supported on the support structure having a toothed portion capable of engaging said peripheral toothing, a second member supported axially movable on the support structure and having a tapered portion, said second member being constructed and positioned to move the first member into engagement with the toothing when engaging the first member at one part of the tapered portion and to release the first member when engaging the same at another part of the tapered portion, a spring supported on the support structure and urging the second member into its engagement position, thereby positively arresting the focusing knob in a desired angular position, and a button member operatively connected with the second member for moving the same into its releasing position, thereby releasing the focusing knob for rotation when and while the release button is actuated, said button member being supported on the camera bed in a position in which the focusing knob and the button member are operable with the same hand of an operator.

2. A brake and locking device for the lens support of a camera having a bed on which the lens support is movable and a drive means for the lens support operated by a focusing knob, said knob comprising a cup-shaped focusing member having an internal peripheral toothing, a support structure fastened to the camera bed, a first member pivotally supported on the support structure and having a toothed portion capable of engaging said peripheral toothing, a second member supported axially movable on the support structure and having a tapered portion, said second member being constructed and positioned to move the first member into engagement with the toothing when engaging the first member at a wide part of the tapered portion and to release the first member when engaging the same at a narrower part of the tapered portion, a spring supported on the support structure and urging the second member into its engagement position, thereby positively arresting the focusing knob in a desired angular position, a rotatable shaft supported on the support structure and extended substantially across the width of the camera bed, a dog fastened substantially at each end of the shaft, one of these dogs being positioned to coact with the second member, and a button member supported on the camera bed opposite to each dog, each of said button members being constructed to cause a movement of the second member into its release position, thereby releasing the focusing knob for rotation when and while one of the release buttons is actuated.

3. A brake and locking device as described in claim 1, wherein the button member is supported in an opening of the camera bed, one end of the button member being positioned to be accessible from the outside of the camera bed for actuation of the button member from the outside.

4. A brake and locking device for the lens support of a camera having a bed on which the lens support is movable and a drive means for the lens support operated by a focusing knob, said knob comprising a focusing member having a toothing, a support structure fastened to the camera bed, a first member pivotally supported on the support structure and having a pointed portion capable of engaging said toothing, a second member supported axially movably on the support structure and having a tapered portion, said second member being constructed and positioned to move the first member into engagement with the toothing when engaging the first member at a wide part of the tapered portion and to release the first member when engaging the latter at a narrower part of the tapered portion, a spring supported on the support structure and urging the second member into its engaging position, thereby positively arresting the focusing knob in a desired angular position, a pair of dogs each pivotally supported by the camera bed, connecting means operatively connecting the two dogs for transmitting a pivotal movement of one dog to the other, one of the dogs being positioned to coact with the second member, and a button member supported on the camera bed opposite to each dog, each of said button members being constructed to cause a movement of the second member into its release position, thereby releasing the focusing knob for rotation when and while one of the release buttons is actuated.

WILLIAM CASTEDELLO.

REFERENCES CITED

The following references are of record in the file of this patent:

UNITED STATES PATENTS

| Number | Name | Date |
|---|---|---|
| 1,274,561 | Kroedel | Aug. 6, 1918 |
| 2,392,071 | Terrett et al. | Jan. 1, 1946 |

FOREIGN PATENTS

| Number | Country | Date |
|---|---|---|
| 8,054 | Great Britain | of 1889 |
| 143,394 | Germany | Aug. 27, 1903 |